US010344594B2

(12) United States Patent
Rosplock et al.

(10) Patent No.: US 10,344,594 B2
(45) Date of Patent: Jul. 9, 2019

(54) ACTUATOR BEARING ARRANGEMENT

(71) Applicants: James D. Rosplock, Roscoe, IL (US); Douglas P. Smith, Roscoe, IL (US)

(72) Inventors: James D. Rosplock, Roscoe, IL (US); Douglas P. Smith, Roscoe, IL (US)

(73) Assignee: Woodward, Inc., Fort Collins, CO (US)

( * ) Notice: Subject to any disclaimer, the term of this patent is extended or adjusted under 35 U.S.C. 154(b) by 154 days.

(21) Appl. No.: 15/685,936

(22) Filed: Aug. 24, 2017

(65) Prior Publication Data
US 2019/0063220 A1 Feb. 28, 2019

(51) Int. Cl.
F15B 15/12 (2006.01)
F01C 19/08 (2006.01)
F16J 15/54 (2006.01)

(52) U.S. Cl.
CPC .............. *F01C 19/08* (2013.01); *F15B 15/12* (2013.01); *F16J 15/545* (2013.01)

(58) Field of Classification Search
CPC ................................. F15B 15/12; F01C 9/002
See application file for complete search history.

(56) References Cited

U.S. PATENT DOCUMENTS

| 2,479,685 | A | 8/1949 | Ingwer |
| 3,398,884 | A | 8/1968 | Kaatz et al. |
| 3,407,742 | A | 10/1968 | Mitchell et al. |
| 3,451,381 | A | 6/1969 | Armstrong |
| 4,329,129 | A | 5/1982 | Ishizuka et al. |
| 5,672,054 | A | 9/1997 | Cooper et al. |
| 5,947,710 | A | 9/1999 | Cooper et al. |
| 5,951,273 | A | 9/1999 | Matsunaga et al. |
| 5,996,523 | A * | 12/1999 | Fox .................. F15B 15/12 114/150 |
| 7,284,495 | B2 | 10/2007 | Seiford, Sr. |
| 9,376,914 | B2 | 6/2016 | Vading |
| 9,394,893 | B2 | 7/2016 | Mäder et al. |
| 9,650,894 | B2 | 5/2017 | Bülk |
| 2010/0230875 | A1 | 9/2010 | Vandine |
| 2015/0226237 | A1 | 8/2015 | Rosplock et al. |
| 2016/0363236 | A1 | 12/2016 | Smith et al. |

FOREIGN PATENT DOCUMENTS

| DE | 10 2008 015601 A1 | 10/2009 |
| EP | 0 735 279 A2 | 10/1996 |
| EP | 1 074 759 A2 | 2/2001 |

* cited by examiner

*Primary Examiner* — F Daniel Lopez
(74) *Attorney, Agent, or Firm* — Reinhart Boerner Van Deuren P.C.

(57) ABSTRACT

Embodiments of the present invention describe the arrangement of bearings in actuators. In particular, the bearings are fit into a surface of the actuation member instead of into the housing for the actuation member. In an exemplary embodiment of a rotary vane actuator, the bearings are fit into the axial surfaces of the vane actuation member instead of in the floor and rotor cap of the housing. In this way, the problem of an axial bearing working loose and grinding a leak path into the actuation member is addressed.

13 Claims, 4 Drawing Sheets

ACTUATOR BEARING ARRANGEMENT

FIELD OF THE INVENTION

This invention generally relates to actuators and more particularly to actuator bearing arrangements.

BACKGROUND OF THE INVENTION

Hydraulic, pneumatic, electric, and mechanical actuators generally include a housing and an actuation member. For example, a linear hydraulic actuator contains a hydraulic cylinder housing inside which a piston actuation member moves. In another example, a rotary vane actuator includes a housing inside which a vane-type actuation member rotates. In torque tubes having a similar construction, the vane-type actuation member can instead be stationary such that the housing rotates around the vane-type actuation member. Generally, in these actuators, bearings are often used to facilitate motion and prevent friction along the main linear or rotary axis. However, the axial bearings in rotary vane and torque tube actuators can, in some circumstances, wear on the actuation member seals, which can create actuation internal fluid leak paths resulting in actuator dead band.

A cross-sectional view of a conventional rotary vane actuator 10 is shown in FIG. 5. As can be seen in FIG. 5, the rotary vane actuator 10 includes a housing 12 and an actuation member, particularly two vanes 14. The vanes 14 rotate in the housing 12 about the axis defined by rotor 16. The vanes 14 rotate between a rotor cap 18 and a floor 20 of the housing 12. As seen in FIG. 5, seals 21 are provided around three sides of each vane 14 and seal the vane 14 to the rotor cap 18, the floor 20, and the walls of the housing 12. A first axial bearing 22 is interference fit into the rotor cap 18 and machined down to flush with the surface of the rotor cap 18. Similarly, a second axial bearing 24 is interference fit into to the floor 20 of the housing 12 and machined down to flush with the surface of the floor 20.

During operation, the first axial bearing 22 and the second axial bearing 24 tend to work loose from the rotor cap 18 and floor 20, respectively. This creates a ledge in the surface of up to several thousandths of an inch, and this ledge wears against the seals 21, wearing a groove into the seals 21. As mentioned above, this groove creates internal leak paths for the actuation fluid, resulting in actuator dead band and excess internal fluid leakage.

Embodiments of the present invention address the problems associated with bearing placement in actuators. These and other advantages of the invention, as well as additional inventive features, will be apparent from the description of the invention provided herein.

BRIEF SUMMARY OF THE INVENTION

Embodiments of the present invention relate to an improved actuator that does not develop the same leak paths as in prior actuators. In particular, the present invention relates to actuators that do not develop leak paths resulting from the wearing of a bearing on the actuation member seals. The development of such leak paths is avoided by the disclosed arrangement of the bearings in actuators. In particular, the bearings are fit into a surface of the actuation member instead of, for example, into the housing for the actuation member. In an exemplary embodiment of a rotary vane actuator, the bearings are fit into the axial surfaces of the vane actuation member as opposed to the floor and rotor cap of the housing. In this way, the bearings and seals move together with the actuation member, and the issue of an axial bearing working loose and wearing a leak path into the actuation member seals is addressed.

In one aspect, embodiments of an actuator are provided. The actuator includes a housing having at least one housing surface and an actuation member having at least one actuation member surface. The actuator also includes a seal disposed on the actuation member surface that contacts the housing surface. Further, the actuator includes at least one bearing. The bearing is inserted into the actuation member surface, and the bearing does not contact the seal during actuation of the actuator.

In certain embodiments, the housing is stationary and the actuation member is configured to move relative to the housing. In such embodiments, the housing includes a rotor cap, a peripheral wall, and a floor that define a fluid chamber. The actuation member is preferably a rotor, including at least one vane that moves within the fluid chamber. Further, the housing surface includes a rotor cap surface and a floor surface. The actuation member surface includes two axial vane surfaces. Each bearing is fit into one of the axial vane surfaces, and each bearing contacts one of the rotor cap surface and the floor surface.

In particular embodiments, there are two bearings on one or both of the axial vane surfaces. In still other particular embodiments, the actuator includes two vanes. In such embodiments, one vane has a bearing on its first axial vane surface, and the other vane has a bearing on its second axial vane surface. In other such embodiments, each vane includes two bearings on each of its axial vane surfaces. Further, in preferred embodiments, the actuator does not comprise an axial thrust bearing in the rotor cap or the floor.

In embodiments, each bearing is cylindrical and is press fit into the actuation member surface. In still other embodiments, the bearing is at least partially metallic, non-metallic, organic, or composite. In yet other embodiments of the actuator, the actuation member is stationary, and the housing is configured to move relative to the actuation member. In such embodiments, the actuation member includes one or more vanes. In particular, the actuator is a torque tube.

In another aspect, embodiments of a rotary vane actuator are provided. The rotary vane actuator includes a housing defining a peripheral wall and a floor. Also included is a rotor cap, and the rotor cap, peripheral wall, and the floor define a fluid chamber. A rotor is additionally included in the rotary vane actuator. The rotor includes a vane that is configured to move within the fluid chamber. A seal is provided on each of the axial surfaces of the vane such that the seal contacts the rotor cap and the floor. The rotary vane actuator also includes at least one bearing in at least one of its axial surfaces, and the bearing does not contact the seal during actuation of the rotary vane actuator.

In embodiments, each bearing is at least partially metallic, non-metallic, organic, or composite. In other embodiments, the rotary vane actuator includes two vanes. In such embodiments, one vane has a bearing on its first axial vane surface, and the other vane has a bearing on its second axial vane surface. In other such embodiments, each vane includes two bearings on each of its axial vane surfaces. Additionally, the rotary vane actuator does not comprise an axial thrust bearing in the rotor cap or the floor. In embodiments, each bearing is cylindrical and press fit into the at least one of the axial surfaces of the vane. In a particular embodiment, the rotary vane actuator is pneumatic.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Embodiments of the present invention relate to an improved actuator that does not develop the same leak paths as in prior actuators. In particular, the present invention relates to actuators that do not develop leak paths resulting from the wearing of a bearing on the seals of an actuation member. The development of such leak paths is avoided by the disclosed arrangement of the bearings in actuators. For example, in a rotary vane actuator, the bearings are fit into the axial surfaces of the vanes instead of, as described above, in the floor and rotor cap of the housing. In this way, the bearings rotate with the seals of the vanes during actuation, and the issue of an axial bearing working loose and wearing a leak path into the actuation member is addressed. That is, unlike conventional actuator arrangements in which the seals moved over the bearing, the seals and bearings are not in contact during actuation of the actuation member. While exemplary embodiments of the present invention are described in the context of a rotary vane actuator, the bearing placement discussed herein is applicable to other actuators, and therefore, these exemplary embodiments should not be taken as limiting.

Figure 1:
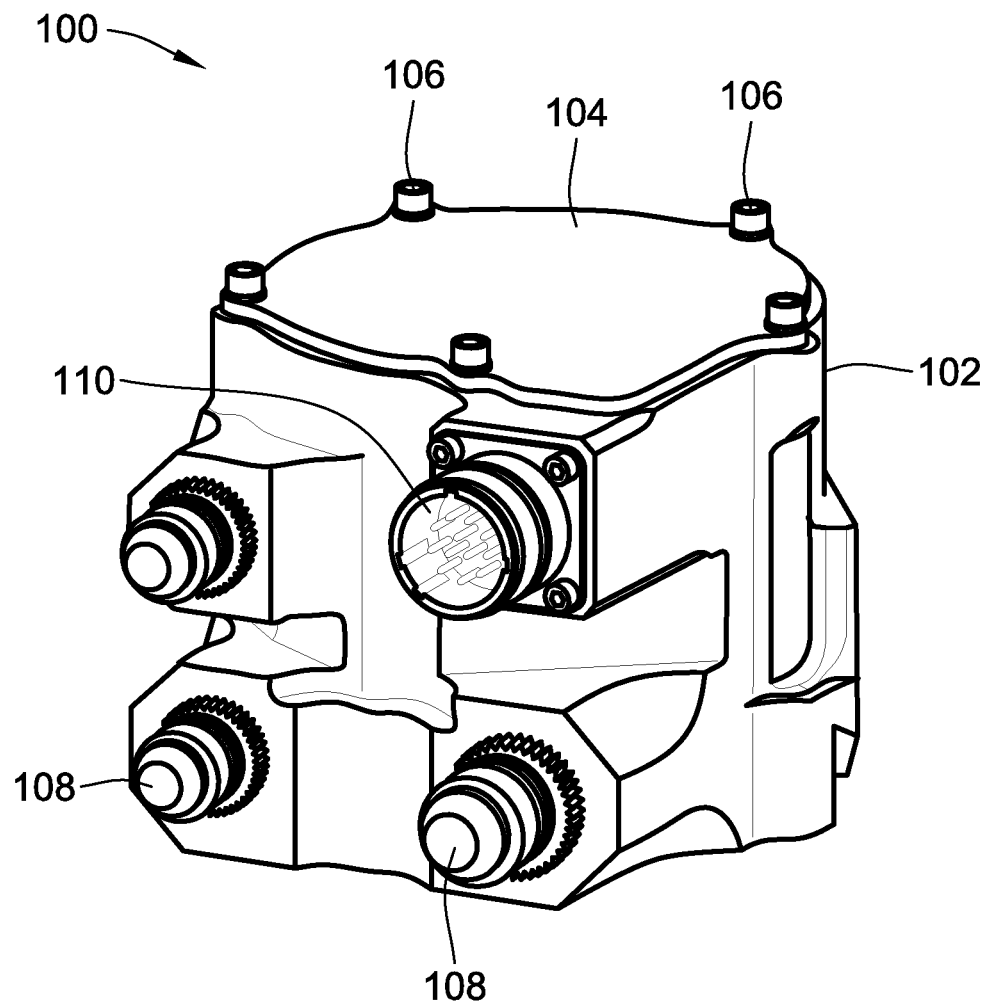
FIG. 1 is an isometric view of a rotary vane actuator, according to an exemplary embodiment.

FIG. 1 depicts a rotary vane actuator 100 according to an exemplary embodiment. The rotary vane actuator 100 includes a housing 102 with a cover plate 104. The cover plate 104 is attached to the housing with a plurality of fasteners 106. As can also be seen in FIG. 1, the rotary vane actuator 100 also includes multiple fluid ports 108. The fluid ports 108 are both inlet and outlet ports depending on the direction that the rotary vane actuator 100 is actuated. The rotary vane actuator 100 is generally fluidically actuated, e.g., pneumatic or hydraulic. An electrical port 110 is also provided in the housing 102 to communicate electrical feedback signal voltage from the rotary vane actuator 100 to a controller.

Figure 2:
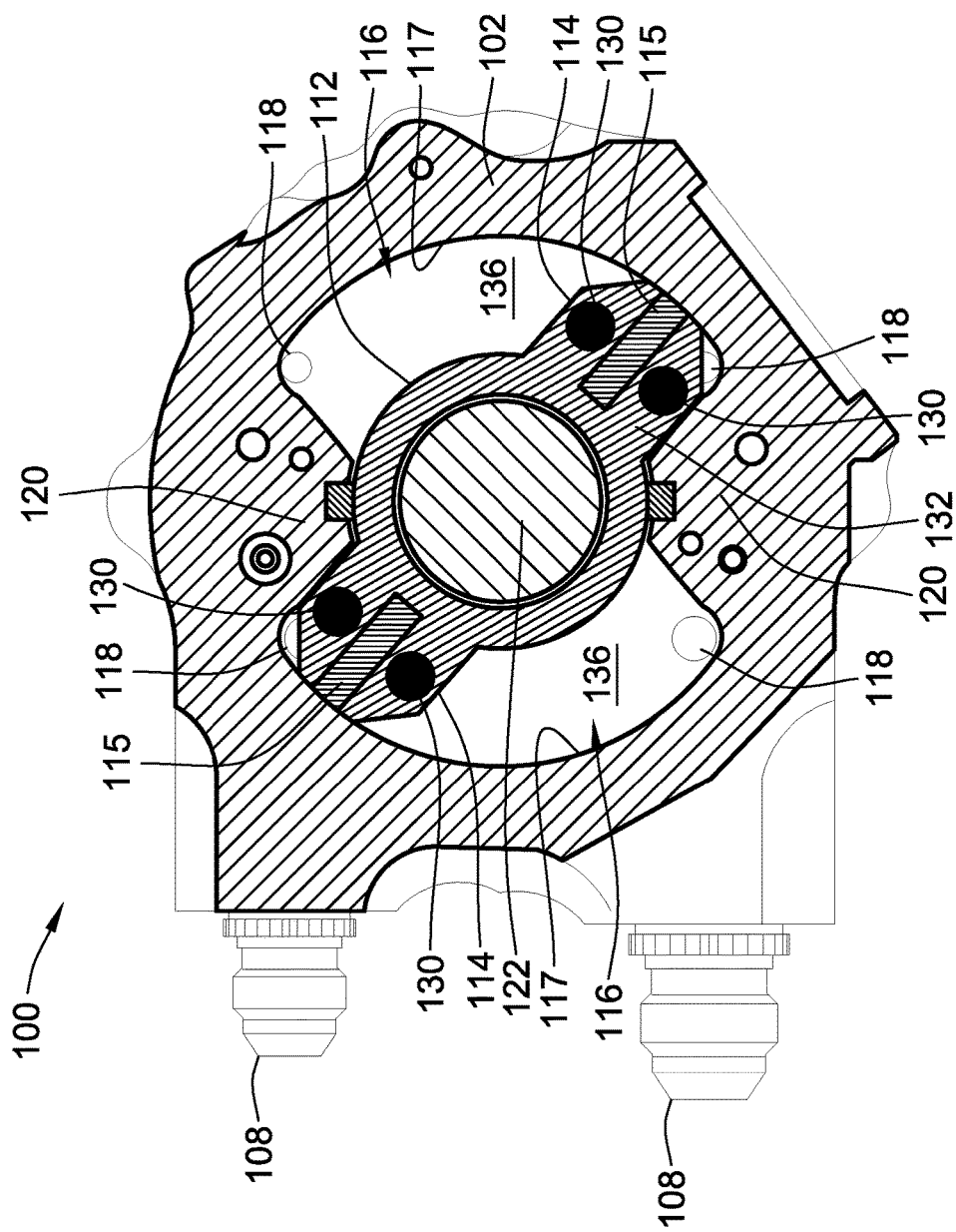
FIG. 2 is a horizontal cross-sectional view of the rotary vane actuator of FIG. 1, according to an exemplary embodiment.
Figure 5:
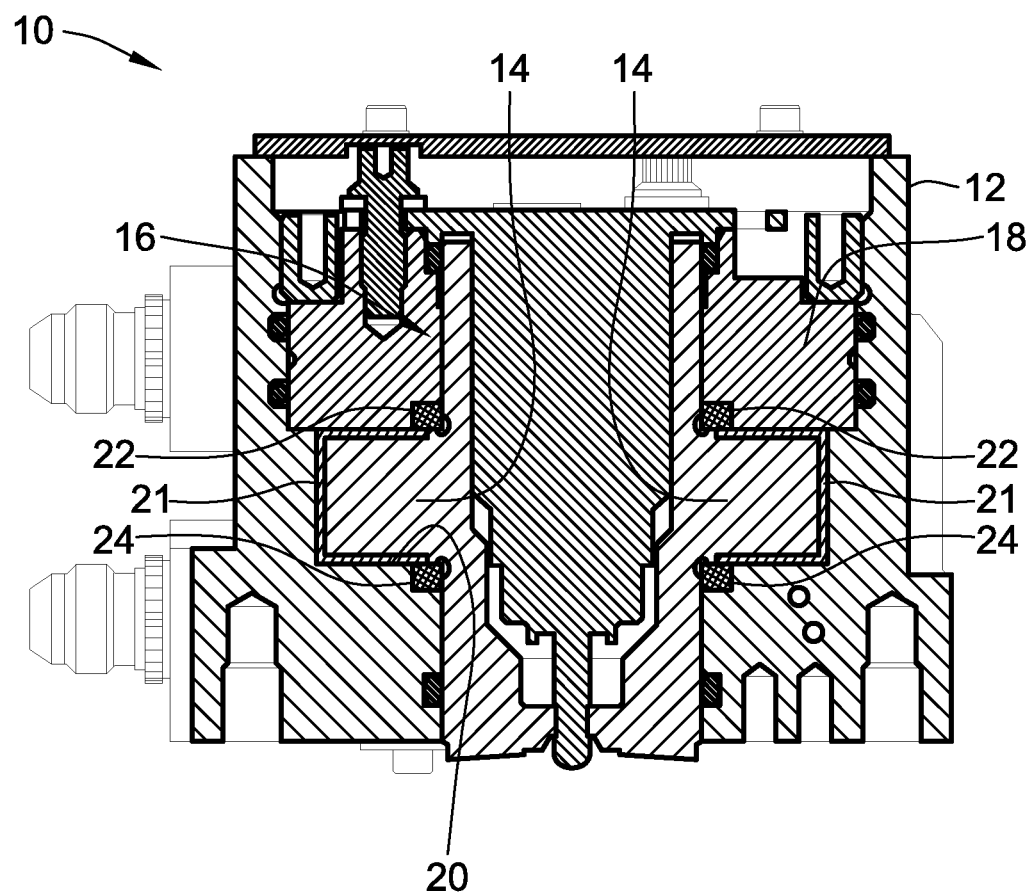
FIG. 5 is a prior art depiction of a rotary vane actuator including axial thrust bearings.

FIG. 2 provides a horizontal cross-sectional view of the rotary vane actuator 100 of FIG. 1. As is depicted in FIG. 2, the rotary vane actuator 100 includes an actuation member comprised of a rotor 112 that rotates about an axis on the interior of the housing 102 and two vanes 114 projecting radially from the rotor 112. In other embodiments, the rotor 112 includes only a single vane 114, and in still other embodiments, the rotor 112, includes more than two vanes 114. Each vane 114 includes a seal 115 that extends around three sides of the vane 114 (e.g., similar to the arrangement of seals 21 in FIG. 5). In embodiments, the seal 115 is made of an elastomeric material with a low friction coating, such as PTFE. As will be discussed more fully below, axial bearings 130 are fit such that the vane 114 does not directly contact the housing 102, which could, in some circumstances, affect operation of the rotary vane actuator 100 as a result of axial loading and friction.

The vanes 114 rotate within fluid chambers 116 defined in part by a peripheral wall 117 of the housing 102. The fluid chambers 116 are in fluid communication with the fluid ports 108 via fluid ducts 118. In embodiments, fluid is forced into the fluid chambers 116 to cause rotation of the vanes 114 and, consequently, rotation of the rotor 112. The force of pressurized fluid in the fluid chambers 116 is used to rotate the vanes 114 between shoes 120 so as to position the rotor 112 within the housing. In this way, the rotor 112 is able to be used to position a downstream component, such as a valving member. The position of such a valving member can be sensed with a position sensor 122 that can be seen in greater detail in FIG. 3.

Figure 3:
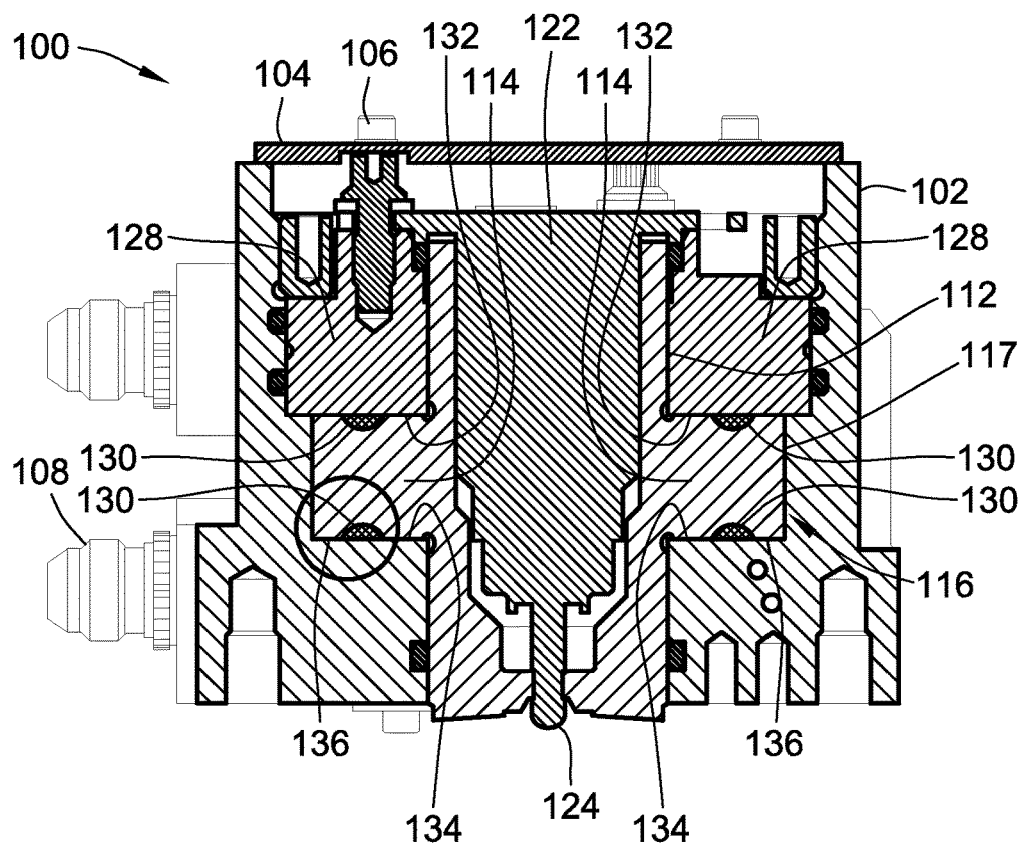
FIG. 3 is a vertical cross-sectional view of the rotary vane actuator of FIG. 1, according to an exemplary embodiment.

As can be seen in FIG. 3, the position sensor 122 is inserted into an internal cavity of the rotor 112. A sensor rod 124 communicates the rotational position of the valving member. As is also depicted in FIG. 3, the fluid chambers 116 containing the vanes 114 are sealed with a rotor cap 128. Maintenance of a seal between the vane 114 and the rotor cap 128, the peripheral wall 117, and the floor 136 of the housing 102 is important for reliable actuation of the rotary vane actuator 100. The seals 115 of each vane 114 (as depicted in FIG. 2) provide such a seal between these components. The vane 114, rotor cap 128, and floor 136 are in close proximity such that any imbalance in the moving members could lead to undesirable wear, creating leak paths and decreasing service life. As discussed above, this issue was conventionally addressed using axial thrust bearings positioned around the rotor 112, but as also discussed above, these axial thrust bearings tend to dislodge from their grooves and wear against the seals 115 of the vanes 114, which also creates leak paths.

By contrast, the rotary vane actuator 100 according to embodiments of the present invention includes sliding thrust bearings 130 located on at least one of the axial surfaces of the vanes 114. In particular, the vanes 114 include a first axial surface 132 facing the rotor cap 128 and a second axial surface 134 facing the floor 136 of the housing 102. The sliding thrust bearings 130 are included in one or both of the first axial surface 132 and the second axial surface 134. In embodiments, the sliding thrust bearings 130 are transition or press fit into the first and/or second axial surface 132, 134 of the vane 114. Additionally, the sliding thrust bearings 130 are able to be secured to the vane 114 using bonding agents or fasteners.

As shown in the embodiment of FIG. 3, the sliding thrust bearings 130 are provided on both the first axial surface 132 and the second axial surface 134. In this way, the sliding thrust bearings 130 are trapped in place by the assembly of the rotor cap 128 and floor 136 of the housing 102, such that, even if they should work loose, the sliding thrust bearings 130 are still unable to contact the seals 115 and still operate to support axial loads and reduce friction during actuation of the vanes 114.

Referring back to the embodiment depicted FIG. 2, there are two sliding thrust bearings 130 located on either side of the seal 115 on the first axial surface 132 of each vane 114. Similarly, although not depicted in FIG. 2, the second axial surface 134 also includes two sliding thrust bearings 130 per vane 114, and therefore, the vanes 114 of the rotor assembly 112 include eight sliding thrust bearings 130 according to an embodiment of the present invention. However, in other embodiments, the first axial surface 132 of each vane 114 includes only one sliding thrust bearing 130 or more than two sliding thrust bearings 130. Additionally, in other embodiments, the second axial surface 134 includes only one sliding thrust bearing 130 or more than two sliding thrust bearings 130. Further, in embodiments, the first axial surface 132 and the second axial surface 134 of each vane 114 contain a different number of sliding thrust bearings 130. For example, in an embodiment, the first axial surface 132 of a first vane 114 includes one or more sliding thrust bearings 130, while the first axial surface 132 of a second vane 114 do not include any thrust bearings. Further, the second axial surface 134 of the second vane 114 includes one or more sliding thrust bearings 130, while the second axial surface 134 of the first vane 114 does not include any thrust bearings. In such an embodiment, including sliding thrust bearings 130 on the opposite surfaces of each vane 114 still balances the vanes 114 during actuation.

As mentioned above, in still other embodiments, the rotary vane actuator 100 includes only one vane 114 or more than two vanes 114. In such embodiments, at least one sliding thrust bearing 130 is provided on at least one of the first axial surfaces 132 of the vane or vanes 114 and/or on one or more of the second axial surfaces 134 of the vane or vanes 114.

Figure 4:
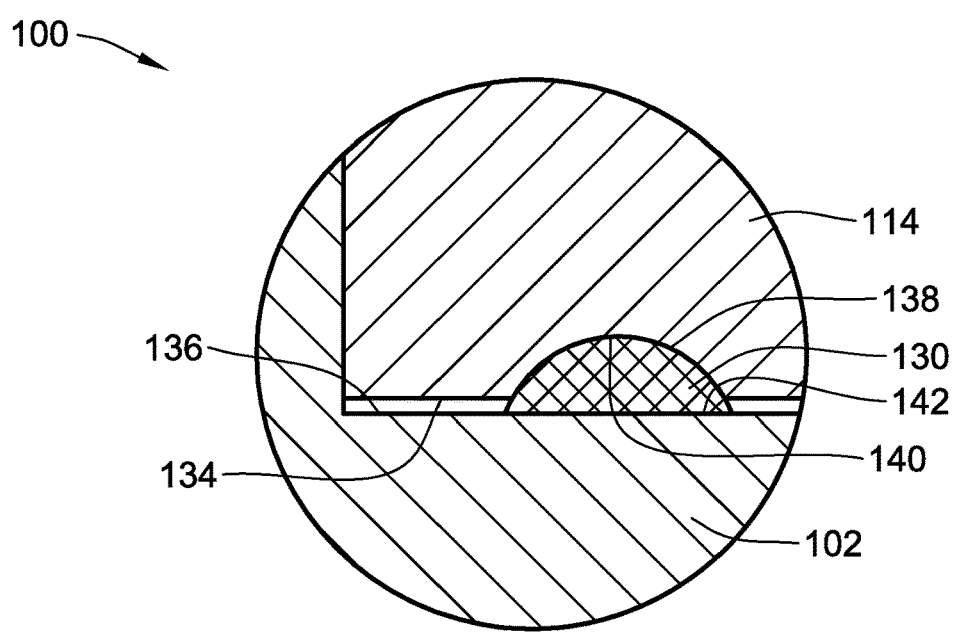
FIG. 4 is a detail view of a vane including a sliding thrust bearing, according to an exemplary embodiment.

A variety of sliding thrust bearings 130 are suitable for use in embodiments of the present invention. In particular embodiments, sliding thrust bearings 130 are metallic, non-metallic, organic, composite, and/or reinforced bearings. In particular, suitable sliding thrust bearings 130 include carbon composite, polytetrafluoroethylene, brass, etc. FIG. 4 provides a detail view of a sliding thrust bearing 130 in the second axial surface 134 of a vane 114. As can be seen, the sliding thrust bearing 130 is press fit in a bearing recess 138 formed into the second axial surface 134 of the vane 114. In this particular embodiment of the sliding thrust bearing 130, the sliding thrust bearing 130 includes a dome surface 140 facing the bearing recess 138 and a sliding surface 142 that is depicted engaging the floor 136 of the housing 102. However, the shape of the sliding thrust bearing 130 is not limited to a dome surface 140. In other embodiments, the sliding thrust bearing 130 is another solid shape, such as a cylinder, prism (e.g., rectangular, trapezoidal, triangular, etc.), oblong, etc. Thus, while in FIG. 2 the sliding face 142 is depicted as circular, other sliding face 142 shapes are also able to be utilized depending on a variety of factors, including the amount of bearing surface necessary for a particular design, size of the axial vane surfaces, etc.

As the vane 114 moves within the fluid chamber 116 (as shown, e.g., in FIG. 2), the sliding thrust bearing 130 reduces the sliding friction between the second axial surface 134 of the vane 114 and the floor 136 of the housing. Further, the sliding thrust bearing 130 helps the vane 114 move in a balanced manner, i.e., such that the second axial surface 134 moves parallel to the floor 136. Still further, the sliding thrust bearing 130 helps support internal and external axial loads on the vane 114 in either direction.

As mentioned above, the bearing placement discussed herein is applicable to other types of actuators besides a rotary vane actuator. For example, in a torque tube, the construction of the actuator is similar in that the actuator contains a housing and vane-type actuation members, but in a torque tube, the housing rotates while the vane-type actuation members are stationary. In such an actuator, the thrust bearings are again placed in the axial surfaces of the actuation member. In this context, "axial surfaces" are those surfaces in planes perpendicular to the axis of actuation. In a torque tube, the axis of actuation is the axis about which the housing rotates.

The teachings regarding bearing placements described in the exemplary embodiments of the actuators discussed herein are applicable to other actuator types. In general, the bearings are placed on a surface of the actuation member instead of being fit into the housing or a component of the housing. In this way, the wear on the actuation member is reduced during operation.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An actuator, comprising:
    a housing including a rotor cap, a peripheral wall, and a floor that define at least one fluid chamber and having at least one housing surface;
    wherein the at least one housing surface includes a rotor cap surface and a floor surface;
    an actuation member including at least one vane configured to move within the at least one fluid chamber;
    wherein the actuation member having at least one actuation member surface;
wherein the actuation member surface includes a first axial vane surface and a second axial vane surface;
    a seal disposed on the at least one actuation member surface and contacting the at least one housing surface;
    at least two bearings, wherein both of the at least two bearings are inserted into one of the first axial vane surface and the second axial vane surface and the at least two bearings contact one of the rotor cap surface and the floor surface;
    wherein the at least two bearing do not contact the seal during actuation of the actuator; and
    wherein the housing is stationary and the actuation member is configured to move relative to the housing.

2. The actuator of claim 1, wherein the at least one vane comprises two vanes; and
    wherein one vane has the at least two bearings on its first axial vane surface and the other vane has at least one bearing on its second axial vane surface.

3. The actuator of claim 1, wherein the at least one vane comprises two vanes; and
    wherein each vane includes at least two bearings on its first axial vane surface and at least two bearings on its second axial vane surface.

4. The actuator of claim 1, wherein the actuator does not comprise an axial thrust bearing in the rotor cap or the floor.

5. The actuator of claim 1, wherein each of the at least two bearings is cylindrical and wherein each of the at least two bearings is press fit into the one of the first axial vane surface and the second axial vane surface.

6. The actuator of claim 1, wherein the at least two bearings is at least partially metallic, non-metallic, organic, or composite.

7. A rotary vane actuator, comprising:
    a housing defining a peripheral wall and a floor;
    a rotor cap, the rotor cap, peripheral wall, and the floor defining at least one fluid chamber;
    a rotor including at least one vane, the at least one vane configured to move within the at least one fluid chamber and the at least one vane including a first axial surface and a second axial surface;
    a seal extending across at least a portion of the first axial surface and across at least a portion of the second axial surface, the seal contacting the rotor cap and the floor; and
    at least two bearings, both inserted into one of the first axial surface and the second axial surface, the at least two bearings not contacting the seal during actuation of the rotary vane actuator.

8. The rotary vane actuator of claim 7, wherein each of the at least two bearings is at least partially metallic, non-metallic, organic, or composite.

9. The rotary vane actuator of claim 7, wherein the at least one vane comprises two vanes; and
    wherein one vane has the at least two bearings on its first axial vane surface and the other vane has at least one bearing in its second axial vane surface.

10. The rotary vane actuator of claim 7, wherein the at least one vane comprises two vanes and wherein each vane includes at least two bearings on its first axial surface and at least two bearings on its second axial surface.

11. The rotary vane actuator of claim 7, wherein the rotary vane actuator does not comprise an axial thrust bearing in the rotor cap or the floor.

12. The rotary vane actuator of claim 7, wherein each of the at least two bearings is cylindrical and press fit into the at least one of the first axial surface and the second axial surface.

13. The rotary vane actuator of claim 7, wherein the rotary vane actuator is pneumatic.

* * * * *